US008012335B2

(12) United States Patent
Shindo et al.

(10) Patent No.: US 8,012,335 B2
(45) Date of Patent: Sep. 6, 2011

(54) METHOD FOR COLLECTION OF VALUABLE METAL FROM ITO SCRAP

(75) Inventors: Yuichiro Shindo, Ibaraki (JP); Kouichi Takemoto, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 171 days.

(21) Appl. No.: 12/445,763

(22) PCT Filed: Jun. 27, 2007

(86) PCT No.: PCT/JP2007/062898

§ 371 (c)(1), (2), (4) Date: Apr. 16, 2009

(87) PCT Pub. No.: WO2008/053619

PCT Pub. Date: May 8, 2008

(65) Prior Publication Data

US 2010/0294082 A1 Nov. 25, 2010

(30) Foreign Application Priority Data

Oct. 24, 2006 (JP) ................................ 2006-288188

(51) Int. Cl.

| | |
|---|---|
| ***C25D 3/30*** | (2006.01) |
| ***C25C 5/00*** | (2006.01) |
| ***C25C 5/02*** | (2006.01) |
| ***C25C 1/14*** | (2006.01) |
| ***C25B 11/04*** | (2006.01) |

(52) U.S. Cl. ........ 205/300; 205/346; 205/544; 205/564; 423/89; 423/92

(58) Field of Classification Search ........................ None
See application file for complete search history.

(56) References Cited

U.S. PATENT DOCUMENTS

| | | | |
|---|---|---|---|
| 4,950,326 A | 8/1990 | Holly | |
| 4,981,564 A * | 1/1991 | Kroll et al. | 205/253 |
| 5,290,412 A * | 3/1994 | Saito et al. | 204/227 |
| 6,117,209 A * | 9/2000 | Adanuvor | 75/739 |
| 6,896,788 B2 | 5/2005 | Shindo et al. | |
| 7,157,024 B2 * | 1/2007 | Isaji et al. | 252/519.1 |
| 7,435,325 B2 | 10/2008 | Shindo et al. | |
| 2009/0004498 A1 | 1/2009 | Shindo et al. | |
| 2010/0072075 A1 | 3/2010 | Shindo et al. | |
| 2010/0084279 A1 | 4/2010 | Shindo et al. | |
| 2010/0084281 A1 | 4/2010 | Shindo et al. | |
| 2010/0101963 A1 | 4/2010 | Shindo et al. | |
| 2010/0101964 A1 | 4/2010 | Shindo et al. | |
| 2010/0193372 A1 | 8/2010 | Shindo et al. | |
| 2010/0282615 A1 | 11/2010 | Shindo et al. | |
| 2010/0288645 A1 | 11/2010 | Shindo et al. | |
| 2010/0288646 A1 | 11/2010 | Shindo et al. | |
| 2010/0294082 A1 | 11/2010 | Shindo et al. | |
| 2010/0316544 A1 | 12/2010 | Shindo et al. | |

FOREIGN PATENT DOCUMENTS

| | | |
|---|---|---|
| JP | 11343590 A * | 12/1999 |
| JP | 2003-247089 A | 9/2003 |
| JP | 2003247089 A * | 9/2003 |
| JP | 2005-314786 A | 11/2005 |

OTHER PUBLICATIONS

Mochida, JP 11343590 English Derwent Abstract.*
Mochida, JP 11343590 English PAJ Abstract.*
Shindo et al, JP 2003-247089, English Abstract from PAJ Website.*
Shindo et al, JP 2003-247089, English Detailed Description from PAJ Website.*
One page English language Abstract of JP 62-290900 A, Dec. 17, 1987.
One page English language Abstract of JP 08-041560 A, Feb. 13, 1996.
One page English language Abstract of JP 03-082720 A, Apr. 8, 1991.
One page English language Abstract of JP 2000-169991 A, Jun. 20, 2000.
One page English language Abstract of JP 2002-069684 A, Mar. 8, 2002.
One page English language Abstract of JP 2002-069544 A, Mar. 8, 2002.
One page English language Abstract of JP 2002-241865 A, Aug. 28, 2002.

* cited by examiner

*Primary Examiner* — Melvin Mayes
*Assistant Examiner* — Colin W Slifka
(74) *Attorney, Agent, or Firm* — Howson & Howson LLP

(57) ABSTRACT

Proposed is a method for collecting valuable metal from an ITO scrap including a step of collecting tin by subjecting the ITO scrap to electrolysis. Further proposed is a method for collecting valuable metal from an ITO scrap including the steps of providing an ITO electrolytic bath and a tin collecting bath, dissolving the ITO scrap in the electrolytic bath, and thereafter collecting tin in the tin collecting bath. Additionally proposed is a method for collecting valuable metal from an ITO scrap including the steps of dissolving the ITO scrap by subjecting it to electrolysis as an anode in electrolyte, precipitating only tin contained in the solution as tin itself or a substance containing tin, extracting the precipitate, placing it in a collecting bath, re-dissolving this to obtain a solution of tin hydroxide, and performing electrolysis or neutralization thereto in order to collect tin. Consequently, provided is a method for efficiently collecting tin from an ITO scrap of an indium-tin oxide (ITO) sputtering target or an ITO scrap such as ITO mill ends arising during the manufacture of such ITO sputtering target.

6 Claims, No Drawings

METHOD FOR COLLECTION OF VALUABLE METAL FROM ITO SCRAP

BACKGROUND OF THE INVENTION

The present invention relates to a method for collecting valuable metal from an ITO scrap such as a spent indium-tin oxide (ITO) sputtering target or ITO mill ends arisen during the manufacture of the ITO sputtering target (hereinafter collectively referred to as an "ITO scrap" in this specification).

In recent years, an indium-tin oxide ($In_2O_3$—$SnO_2$: generally known as ITO) sputtering target is being widely used for a transparent conductive thin film of an LCD device or a gas sensor. In many cases, however, a thin film is formed on a substrate or the like by employing the sputtering method as the thin-film forming means.

Although the sputtering method as the thin-film forming means is a superior method, if a sputtering target is used to form a transparent conductive thin film, the target will not be consumed uniformly. A portion of the target with severe consumption is generally referred to as an eroded portion, and the sputtering operation is continued until immediately before a backing plate supporting the target becomes exposed due to the further consumption of the eroded portion. This target is subsequently replaced with a new target.

Accordingly, a spent sputtering target will have numerous non-eroded portions; that is, unused portions of the target, and all of these portions become scrap. Moreover, even during the manufacture of ITO sputtering targets, scraps (mill ends) will arise from grinding dust and cutting wastage. Generally speaking, the scrap contains roughly 9.7 wt % of tin oxide ($SnO_2$), but the scrap is mostly indium oxide ($In_2O_3$).

Because high-purity materials are used as the ITO sputtering target material and because indium is particularly expensive, indium and tin are simultaneously collected from the foregoing scrap materials. As this kind of indium collection method, conventionally, a method that combines wet refining such as the acid solution process, ion exchange method, and solvent extraction method is used.

For instance, there is a method of subjecting an ITO scrap to cleansing and pulverization, dissolving the ITO scrap in nitric acid, precipitating and eliminating impurities, such as zinc, tin, lead and copper, as sulfide by passing hydrogen sulfide through the solution, thereafter adding ammonia to neutralize the solution, and collecting the resulting indium hydroxide.

Nevertheless, the indium hydroxide obtained by the foregoing method has inferior filtration property, requires long operational process, and contains large amounts of impurities such as Si and Al. In addition, with the created indium hydroxide, since the grain size and grain size distribution will vary depending on the neutralization condition, maturization condition and other conditions, there is a problem in that the characteristics of the ITO target cannot be stably maintained upon subsequently manufacturing such ITO target.

Conventional technology and its advantages and disadvantages are described below.

As one example of such conventional technology, there is an etching method of a transparent conductive film including the steps of reducing an ITO film deposited on a substrate by an electrochemical reaction in the electrolyte, and dissolving the reduced transparent conductive film in the electrolyte (refer to Patent Document 1). However, the object of this method is to obtain a mask pattern with high precision, and relates to technology that is different from the collection method.

For pretreatment to collect valuable metal from ITO, there is also technology of separating, in the electrolyte, the impurities contained in an In-based brazing filler material used in the bonding with the backing plate (refer to Patent Document 2). Nevertheless, this method does not relate to technology of directly collecting valuable metal from ITO.

Moreover, upon collecting indium from an intermediate obtained as a by-product of the zinc refining process or an ITO scrap, disclosed is technology of separating tin as halogenated stannate, performing reduction treatment with hydrochloric acid or nitric acid solution, subsequently adjusting the pH of this aqueous solution to 2 to 5, reducing metallic ions of iron, zinc, copper, thallium and the like in order to make the metallic ions into a substance that will not precipitate easily, and separating the indium component in the aqueous solution (refer to Patent Document 3). With this technology, however, there is a problem in that the refining process is complicated, and a superior refining effect cannot be expected.

Further, as a method for collecting high-purity indium, disclosed is technology of dissolving ITO scrap in hydrochloric acid, adding alkali thereto to make the pH 0.5 to 4, eliminating tin as hydroxide, subsequently blowing hydrogen sulfide gas in order to eliminate hazardous materials such as copper and lead as sulfide, and electrowinning indium metal by performing electrolysis using the obtained solution (refer to Patent Document 4). There is a problem with this technology in that the refining process is complicated.

In addition, proposed is a method of dissolving an ITO indium-containing scrap in hydrochloric acid to obtain an indium chloride solution, adding a sodium hydroxide solution to this solution to eliminate tin as tin hydroxide, additionally adding a sodium hydroxide solution after the elimination to obtain indium hydroxide, filtering the obtained indium hydroxide to obtain indium sulfate from the filtered indium hydroxide, and obtaining indium by electrowinning the indium sulfate (refer to Patent Document 5). Although this is an effective method with a significant refining effect, there is a drawback in that the process is complicated.

Also proposed is a method for collecting indium including the steps of dissolving an ITO indium-containing scrap in hydrochloric acid to obtain an indium chloride solution, adding a sodium hydroxide solution to the indium chloride solution to eliminate tin contained in the scrap as tin hydroxide, substituting indium with zinc from the solution after eliminating the tin hydroxide, and thereafter collecting indium (refer to Patent Document 6). Although this is also an effective method with a significant refining effect, there is a drawback in that the process is complicated.

Additionally disclosed is a method for collecting metallic indium including the steps of extracting suboxide-containing cast scrap floating on molten metallic indium, introducing this into an atmosphere furnace, introducing argon gas into the furnace after vacuating the furnace once, heating the furnace to a prescribed temperature, and reducing the suboxide-containing cast scrap (refer to Patent Document 7).

Although this is in itself an effective method, there is a drawback in that this is not a fundamental collection method of ITO scrap.

In light of the above, a method that is efficient and with a versatile collection process is being sought.

[Patent Document 1] Japanese Patent Laid-Open Publication No. S62-290900

[Patent Document 2] Japanese Patent Laid-Open Publication No. H8-41560

[Patent Document 3] Japanese Patent Laid-Open Publication No. H3-82720

[Patent Document 4] Japanese Patent Laid-Open Publication No. 2000-169991

[Patent Document 5] Japanese Patent Laid-Open Publication No. 2002-69684

[Patent Document 6] Japanese Patent Laid-Open Publication No. 2002-69544

[Patent Document 7] Japanese Patent Laid-Open Publication No. 2002-241865

SUMMARY OF THE INVENTION

In order to overcome the foregoing problems, the present invention provides a method for efficiently collecting tin from an ITO scrap of an indium-tin oxide (ITO) sputtering target or an ITO scrap such as ITO mill ends arising during the manufacture of such ITO sputtering target.

Thus, the present invention provides a method for collecting valuable metal from an ITO scrap including a step of collecting tin by subjecting the ITO scrap to electrolysis. As the electrolyte upon collecting valuable metal from the ITO scrap, an alkali solution of sodium hydroxide, potassium hydroxide, ammonium hydroxide or the like is primarily used.

The foregoing electrolyte solutions are preferable examples and there is no particular limitation on the electrolyte solution that may be used. And, the conditions for efficiently collecting valuable metal may be arbitrarily selected. Desirably, pH of the electrolyte solution is adjusted to 11 to 15. With the foregoing pH condition, indium dissolved in the electrolyte will precipitate as indium hydroxide. In particular, if the pH is set to 12 to 13, this is a preferable condition for electrodepositing tin on a cathode and efficiently collecting tin.

Moreover, it is also possible to collect tin by subjecting the ITO scrap to electrolysis as an anode in electrolyte so as to dissolve the ITO scrap, precipitating only tin as tin itself or a substance containing tin (for instance, metastannic acid), extracting this precipitate, placing it in a collecting bath, re-dissolving this to obtain a solution of tin hydroxide, and subjecting this to electrolysis or neutralization.

The conditions including the current density for performing electrolysis to the scrap such as a spent target or mill ends are not uniformly defined, and the current density is appropriately selected according to the amount of such mill ends or the property of the material. The liquid temperature of the electrolyte solution is generally in the range of 0 to 100° C., and preferably in the range of 20 to 50° C.

The method for collecting tin by electrolysis according to the present invention is an extremely simple method since the ITO scrap is simply subject to electrolysis as an anode. Nevertheless, no conventional technology has previously adopted this kind of method. The collected high-purity tin can be used for the recycle of an ITO sintered target.

The provided method for efficiently collecting high-purity tin is a superior method in which tin can be collected extremely easily; that is, an ITO scrap of an indium-tin oxide (ITO) sputtering target or an ITO scrap such as ITO mill ends arising during the manufacture of such ITO sputtering target is simply subject to electrolysis as an anode.

DETAILED DESCRIPTION OF THE INVENTION

The present invention provides a method for efficiently collecting tin through the precipitation of tin contained in the electrolyte onto the cathode by subjecting the scraps containing tin and indium of an ITO target to electrolysis.

If an alkali solution is used as the electrolyte, since tin will be electrodeposited on the cathode and indium will become hydroxide, tin can be collected on the cathode. Further, if an acid solution is used as the electrolyte, precipitate containing tin is extracted, tin is dissolved, and the obtained solution is subject once again to electrolysis or neutralization to collect tin. In order to improve the current efficiency, well-known additive agents may also be used during the foregoing electrolysis. The use of an additive agent is subject to the condition that such additive agent will not deteriorate the purity of the product.

A special electrolytic apparatus is not required. For instance, the ITO to be subject to electrolysis is used as the anode, and a corrosion-resisting electrode such as carbon is used as the cathode mother plate when performing electrolysis. It is thereby possible to avoid the increase or inclusion of impurities in the anode.

It is desirable to adjust the current density as needed based on the type of raw material. The factor to be adjusted in this case is only the production efficiency. Although there is no particular limitation on the electrolysis temperature, desirably electrolysis is performed by adjusting the temperature to be in a range of 0 to 100° C. Since the current efficiency will deteriorate if the electrolysis temperature is less than 0° C. and the evaporation of the electrolyte will increase if the electrolysis temperature exceeds 100° C., a more preferable range of the electrolysis temperature is 20 to 50° C.

Upon performing electrolysis, the adjustment of pH is important for the precipitation and isolation of tin. Although the precipitation of tin will vary with adjusting the pH, it will also vary with the acid or alkali solution that is used. In either case, it is necessary to adjust the pH to a range where Sn is generated as a precipitate.

When using hydrochloric acid or sulfuric acid, the pH is preferably adjusted to 1 to 2.5. This is because if the pH exceeds 2.5, In will also start to precipitate. Contrarily, since Sn will not precipitate if the pH is less than 1, it is preferable to adjust the pH to be within the foregoing range. Meanwhile, since Sn will precipitate as metastannic acid when nitric acid is used, this is not basically dependent on pH. Nevertheless, since In will start to precipitate if the pH exceeds 2.5, this is not preferable.

When using an alkali solution, the pH is preferably adjusted to 11 to 14. This is because Sn will dissolve and cannot be isolated if the pH exceeds 14, and both Sn and In will precipitate if the pH is less than 11. Both cases are not preferable.

EXAMPLES

The present invention is now explained in detail with reference to the Examples. These Examples are merely illustrative, and the present invention shall in no way be limited thereby. In other words, various modifications and other embodiments based on the technical spirit claimed in the claims shall be included in the present invention as a matter of course.

Example 1

2 kg of ITO (indium oxide-tin oxide) scrap was used as the raw material. The components in this raw material were 9.7 wt % of tin oxide ($SnO_2$) and the remainder indium oxide ($In_2O_3$).

The raw material was placed in an anode box, and electrolytic refining was performed in a sodium hydroxide solution.

The electrolytic conditions were that sodium hydroxide solution as the electrolyte was with a pH of 11 and electrolysis temperature was 50° C.

Consequently, tin electrodeposited on the cathode side. It was thereby possible to obtain tin from the ITO (indium oxide-tin oxide) scrap. Approximately 0.10 kg of tin was obtained with this method. Moreover, it was possible to collect indium as hydroxide.

Example 2

Other than using potassium hydroxide as the electrolyte and adjusting the pH of the electrolyte to 13, electrolysis was performed under the same conditions as Example 1. Consequently, indium precipitated as hydroxide, and tin electrodeposited on the cathode side. It was thereby possible to obtain high-purity tin from the ITO (indium oxide-tin oxide) scrap. Approximately 0.14 kg of tin was obtained with this method.

Example 3

Other than using nitric acid as the electrolyte and adjusting the pH of the electrolyte to 1, electrolysis was performed under the same conditions as Example 1. Consequently, tin precipitated as metastannic acid. This precipitate was extracted and further dissolved in hydrochloric acid. This solution was subject to electrolysis in a collecting bath to electrodeposit tin on the cathode. It was thereby possible to obtain high-purity tin from the ITO (indium oxide-tin oxide) scrap. Approximately 0.14 kg of tin was obtained with this method. Moreover, it was possible to collect indium as hydroxide.

Example 4

Sulfuric acid of 1N was used as the electrolyte, the ITO scrap was placed on the anode box side of a dissolution bath, and electrolysis was performed by partitioning the dissolution bath with an anion-exchange membrane so that it would not electrodeposit on the cathode side. The electrolyte was extracted and placed in a collecting bath, and Sn was precipitated at pH2. It was thereby possible to obtain tin from the ITO (indium oxide-tin oxide) scrap. Approximately 0.14 kg of tin was obtained with this method. Moreover, it was possible to collect indium as hydroxide.

Example 5

Under the same conditions as Example 4, Sn was precipitated at pH2, this precipitate was re-dissolved in hydrochloric acid and placed in a collecting bath, and electrolysis was performed to collect Sn. Approximately 0.12 kg of tin was collected with this method.

Although in each of the foregoing Examples, ITO (indium oxide-tin oxide) mill ends or ITO scraps containing 9.7 wt % of tin oxide ($SnO_2$) and remainder indium oxide ($In_2O_3$) were used, it is possible to arbitrarily change the electrolytic conditions such as the current density and pH according to the component amount of $In_2O_3$ and $SnO_2$, and it goes without saying that there is no particular limitation on the component amount of the raw material. In particular, although the content of tin oxide ($SnO_2$) in the ITO is changed between 5 wt % to 30 wt %, the present invention can still be applied to this case.

In addition, although there are cases where small amounts of accessory components are added to the ITO, so as long as ITO is the basic constituent, it goes without saying that the present invention can also be applied to this case.

The present invention yields a significant industrial advantage in terms of recycling of resources, since provided is a superior method in which tin can be collected extremely easily and efficiently; that is an ITO scrap of an indium-tin oxide (ITO) sputtering target or an ITO scrap such as ITO mill ends arising during the manufacture of such ITO sputtering target is simply subject to electrolysis as an anode.

The invention claimed is:

1. A method for collecting valuable metal from an ITO scrap including the steps of subjecting the ITO scrap to electrolysis as an anode to electrodeposit tin on a cathode and collecting the electrodeposited tin.

2. A method according to claim 1, wherein the ITO scrap consists of 5 to 30wt % tin oxide and a remainder of indium oxide.

3. A method according to claim 1, wherein the ITO scrap consists of 9.7wt % tin oxide and a remainder of indium oxide.

4. A method for collecting valuable metal from an ITO scrap including the steps of providing an ITO electrolytic bath and a tin collecting bath, subjecting the ITO scrap to electrolysis as an anode to dissolve the ITO scrap into an electrolyte of the electrolytic bath, thereafter placing the electrolyte in the collecting bath, adjusting the pH in the collecting bath to precipitate tin, and collecting the tin precipitates.

5. A method for collecting valuable metal from an ITO scrap including the steps of providing an ITO electrolytic bath and a tin collecting bath, subjecting the ITO scrap to electrolysis as an anode to dissolve the ITO scrap into an electrolyte of the electrolytic bath, thereafter placing the electrolyte in the collecting bath, adjusting the pH of the collecting bath to precipitate tin contained in a solution of the collecting bath as tin or a substance containing tin, collecting the tin precipitates or the substance containing tin, placing the precipitates or the substance containing tin in the collecting bath to re-dissolve them to obtain a solution of tin hydroxide, performing electrolysis or neutralization to the solution of tin hydroxide to deposit tin, and collecting the deposited tin.

6. A method for collecting valuable metal from an ITO scrap including the steps of providing an ITO electrolytic bath and a tin collecting bath, subjecting the ITO scrap to electrolysis as an anode in the electrolytic bath to dissolve the ITO scrap into an electrolyte of the electrolytic bath and to precipitate tin as metastannic acid, collecting the metastannic acid, placing the metastannic acid in the collecting bath to dissolve the metastannic acid to obtain a solution, thereafter performing electrolysis to the solution to electrodeposit tin on a cathode, and collecting the electrodeposited tin.

* * * * *